Patented Jan. 12, 1943

2,307,953

UNITED STATES PATENT OFFICE 2,307,953

PURIFICATION OF ORGANIC COMPOUNDS

Dwight James Potter, New York, N. Y., assignor to Colgate-Palmolive-Peet Company, Jersey City, N. J., a corporation of Delaware No Drawing. Application July 5, 1940,
Serial No. 344,140

16 Claims. (Cl. 260—459)

This invention is directed to the preparation of organic acid salts and more particularly it relates to the preparation of organic sulphonate salts substantially free from associated inorganic acid salts.

Although many methods have been described in the prior art for preparing substantially pure organic acid salts containing only a very small amount of inorganic acid salts, there has not been disclosed a simple, inexpensive and generally applicable method whereby associated inorganic acid salts can be removed substantially completely.

More particularly, in the many processes for preparing organic derivatives of polybasic inorganic acids, there is usually associated with the organic derivatives a large amount of the polybasic acids or their salts. For example, when an aromatic hydrocarbon is treated with an acid sulphonating agent to prepare an aromatic sulphonic acid, the product is admixed with a large excess of the acid sulphonating agent or an acid derivative thereof. When this mixture is neutralized to form the desired salt or salts, a considerable percentage of the resulting product is a sulphate of the cation of the neutralizing base. For example, if the neutralizing base is sodium hydroxide, the final salt mixture would comprise the sodium salt of the organic acid compound and sodium sulphate. If an organic base, such as pyridine or methyl amine is employed, the resulting mixture includes the sulphate of the organic cation.

The character of the agents produced in these processes are affected by the presence of these sulphates or other inorganic acid salts in many ways. Inasmuch as the by-product salts seldom have cleaning, emulsifying or like properties, these characteristics of the organic compounds are reduced somewhat. Furthermore, in many uses of detergents, cleansing or emulsifying compounds, the presence of inorganic salts may be undesirable, as when these detergent compounds are to be used in chemical reactions, in the manufacture of dyes, or in other uses where a high degree of purity is essential. Thus it is highly advantageous to have pure or substantially pure compounds for such uses.

The present invention comprises treating either aqueous solutions or dry mixtures of the organic acid salt and inorganic acid salt with an organic solvent. Any undesirable extraneous matter not in solution may be filtered out at this point, if the organic acid salts are all in solution. Some water is usually present to effect complete solution of the organic material in a short time. When sufficient inorganic salts are present to produce an immiscible aqueous saturated inorganic salt solution, the water layer also may be separated at this point. A salt of a volatile cation and a weak volatile acid as a concentrated aqueous solution, or if water is present then as a dry salt, is intimately contacted with the organic solvent mixture. This mixture is permitted to separate into an organic solvent layer containing the organic acid salt of the volatile cation and a small amount of the volatile cation salt of the weak volatile acid. The aqueous layer will contain the major amount of the volatile cation salt of the weak volatile acid, the volatile cation salt of any other inorganic acid anion originally in the mixture under treatment, and corresponding salts of the cations originally in the mixture under treatment. The organic solvent layer may be repeatedly treated with additional portions of the aqueous treating solution in order to insure complete conversion and separation. The organic solvent may then be evaporated from the solution. The mixed salts are heated at a temperature above the decomposition point of the by-product salt but below that of the organic acid salt, usually between 50° and 200° C., preferably at about 90° to 110° C. The product is a substantially pure organic acid salt, all the associated volatile cation salts of the weak volatile acids having been decomposed and vaporized by the heating during and/or after the removal of solvent.

Organic solvents found to be suitable for use in this invention include ethyl, propyl, isopropyl, butyl, isobutyl, tertiary butyl, secondary butyl, amyl and hexyl alcohols, dioxane, ethylene glycol monoethyl ether, diethylene glycol monoethyl ether, mono-glycerides (e. g. of coconut oil fatty acids), monofatty acid esters of glycols (e. g. ethylene glycol monoesters of coconut oil fatty acids), water-soluble aliphatic ketones (e. g. acetone, methyl ethyl ketone, diethyl ketone, and substituted derivatives thereof), isobutyric acid, and ethylene glycol monoethyl ether acetate. These solvents may be used singly or in any desired mixture. It is preferred, however, to employ one or more volatile solvents in order to expedite the removal thereof.

Concentrations of the various compounds and solvents have an important bearing upon the efficiency of this process, as do the temperatures at which the process is carried out. Optimum temperatures within which the invention has been found to be most advantageously operated vary with different compounds. For instance, when a solution containing about 35% solids (about 65% of the solids being sodium sulphate and about 35% being a sodium salt of an organic-sulphuric acid derivative) is being treated, the most desirable temperatures for carrying out the cation exchange between the organic acid salt and the treating solution fall within the range of about 25° C. to about 70° C., although these temperature limits are not absolutely critical, i. e. a temperature slightly less than 25° C. or more than 70° C. is not excluded. An especially desirable temperature range for carrying out this process with this mixture is between about 30° C. and about 45° C. These temperatures may vary with the particular solvent or solvents used as well as with the specific compounds dissolved in the solvent or solvents.

The maximum concentration is governed primarily by the maximum amount of solids that will dissolve in a given quantity of water, and the amount of organic solvent required to effect a separation appears roughly to vary inversely with the concentration of the solids.

The salt product free of by-product salts may be converted to salts of other cations by admixing the product, preferably in the presence of water, with other bases, their anhydrides or salts of volatile weak acids, and heating the mixture to remove volatile bases or salts. If a volatile cation derivative is employed, it may be used in excess, but if a non-volatile cation derivative is employed, it must be in equivalent weight in order for the product to remain free of by-product salts.

The following examples are given to illustrate the invention and in no sense to limit the application thereof.

Example I 1,000 parts by volume of aqueous solution of 8% of a chlorinated gas oil sulphonate sodium salt and also containing sodium chloride obtained by neutralization of the reaction product of gas oil with gaseous chlorine and sulphur dioxide is shaken at 25° C. with an equal volume of isopropanol and sufficient ammonium carbonate to cause separation of a saturated aqueous solution thereof. About 10% of aqueous ammonium hydroxide is added in order to increase the solubility of the ammonium carbonate and hence prepare a more concentrated aqueous solution. The mixture separates into two liquid layers, the upper (solvent) layer containing most of the organic sulphonate. This is separated from the aqueous layer and washed with several successive equal volume portions of concentrated ammonium carbonate solution. The solvent is then evaporated and the residue thoroughly dried at about 100° C. Substantially all the associated ammonium carbonate is vaporized as ammonia, water and carbon dioxide yielding a sulphonate salt product substantially free of inorganic acid salts.

Example II 10 parts by weight of the ammonium salt of chlorinated gas oil sulphonate freed of by-product salts by the process of Example I is dissolved in 100 parts by volume of water and admixed with a molecular excess of pyridine. The mixture is refluxed for about one hour, permitting the volatilized ammonia to escape. The water and any excess pyridine are then volatilized to yield a pyridine salt of the gas oil sulphonate free of by-product inorganic acid salts.

The process may be similarly applied to the preparation of inorganic salts, for example and by using equimolecular proportions of sodium carbonate or sodium hydroxide in place of the pyridine as described in the example. Other salts, such as those of calcium, amyl amine, ethanolamines, quinoline, piperidine, potassium, magnesium, lithium, mercury and various other inorganic and organic cations may also be employed.

Example III 100 parts by volume of a 10% solution of sulphonated mineral oil extract sodium salt is thoroughly mixed at 40° C. with equal volumes of butanol and a concentrated aqueous solution of methyl ammonium carbonate. The mixture separates into two liquid layers. The butanol solution is washed several times with successive portions of the concentrated methyl ammonium carbonate solution. The butanol solution is then heated with vigorous agitation in order to vaporize as much water as possible. Some crystallization of carbonate salts will also result. The butanol solution is separated from crystallized material. The butanol is evaporated and the product dried thoroughly to yield a sulphonate salt substantially free of by-product salts.

The organic solvent solution containing the volatile cation salts may be dried before removing the solvent. This may be accomplished by distillation of a binary or ternary water-solvent mixture from the solution. It may also be by selective absorption with clay or the like. Cooling of the solvent solution may also assist in the precipitation of the salts of inorganic acids therefrom.

It is pointed out that the aqueous layer containing substantially all of the inorganic acid salt in the foregoing examples also contained a small quantity of both the organic compound and the organic solvent. The addition of a small quantity of organic solvent to this solution results in the formation of two liquid layers or phases as illustrated by the examples. Hence, this process is adapted to repeated treatment of the inorganic acid salt solution to remove substantially all of the organic compound. The inorganic salt may be in this manner recovered in substantially pure condition by evaporating the aqueous solution. The organic solvent may also be recovered for reuse in this process, or for any other purpose, by evaporation and condensation.

While the above examples are all directed to the treatment of compositions containing sulphates and chlorides of certain ammonium bases, the invention is also applicable to other volatile bases or mixtures thereof, including volatile organic bases such as those of organic ammonium, e. g. dimethyl amine, ethyl amine, pyridine, butyl amines, amyl amines and propyl amines, phosphonium and sulphonium or any volatile base which forms a water-soluble salt with a weak volatile acid. The weak acid salts include carbonates, bicarbonates, sesquicarbonates, carbamates, sulphites, acid sulphites, formates, acetates and the like.

This invention may be employed to substantially purify organic acid salts by removing therefrom inorganic salts formed in their preparation or to reduce the proportion of the inorganic salt to any predetermined degree by proper regulations of the quantity of organic solvent used, or by other control which one skilled in the art will recognize with an understanding of the process herein disclosed. Hence, it will be possible to prepare, by this invention, an organic acid salt composition having a desired proportion of active ingredient.

Also, this process may be applied to the detergent solution, containing dissolved therein the inorganic salt, which results in most commercial processes now followed in preparing these organic detergents from the raw materials. By utilizing this process at that point, a material saving is effected over the usual methods which necessitate evaporation, extraction, etc.

In all cases optimum results may be obtained by utilizing the most efficient proportion of organic solvent. Hence, where a certain proportion of solvent fails to give the desired purification, a change in the proportion of organic solvent may be found to produce better results. Furthermore, it is believed that in some cases, especially where the proportion of inorganic salt is small, an increase in the proportion of inorganic salt to the organic detergent compound will effect a greater final degree of purification. For this reason, it may be desirable to add to the mixture of organic compound and inorganic salt, or to the solution thereof, more inorganic salt of the volatile cation and volatile weak acid, of the same kind already in the mixture or solution, and/or of a different kind.

This invention is applicable to the separation of a single inorganic acid salt from one or a mixture of organic compounds or of a mixture of inorganic salts from one or a mixture of organic compounds. In all cases one organic solvent may be employed or a mixture of two or more.

Separation of the solvent liquids and volatile salts from the purified organic compound may be effected by evaporating them under pressure, at atmospheric pressure or at sub-atmospheric or reduced pressure, by partial evaporation and centrifuging, or by freezing and centrifuging at reduced temperature or by other methods.

The preferred class of organic compounds which come within the sphere of this invention may be generally classified as organic acid salts and more particularly as that class of organic acid salts which are prepared by neutralizing the reaction product of "sulphonating" agents and organic materials which have been found suitable for the manufacture of synthetic detergents, preferably containing at least six carbon atoms including "sulphonated" fatty oils, fatty acids, mineral oils, carboxylic acids, glycerides (mono- and di-), partial carboxylic acid esters of polyglycerols, glycols and polyglycols, aromatic and alkylated aromatic compounds, long chain alcohols, olefins and coal tar distillates; products of the sulphur dioxide and chlorine treatment of aliphatic materials, products of the catalyzed sulphuryl chloride treatment of organic materials; fatty acid soaps, resin acid soaps and any other carboxylic acid salts, and numerous other organic acid compounds or mixtures of compounds. They include water-soluble detergents whether or not the organic radicals of the molecule are hydrocarbons or contain substituents such as halogens, hydroxyls, acyloxy, alkoxy, ketonic, and nitrogen containing groups, etc. Compounds not enumerated herein are not excluded from the ambit of this invention. As will be recognized from the disclosures hereinafter, compounds other than detergents may be purified by this process.

As many widely different embodiments of the present invention may be made without departing from the spirit and scope thereof, it is to be understood that the application is not limited to the specific proportions or embodiments thereof except as defined in the appended claims.

I claim:

1. The process for removing by-product salts from organic sulphonic acid salts which comprises preparing an organic solvent solution of an organic sulphonic acid salt, treating the solution with sufficient water and a salt of a volatile cation and a weak volatile acid so that a concentrated aqueous solution of a salt of the weak volatile acid and the by-product salt separates from an immiscible aqueous-organic solvent phase containing the organic sulphonic acid salt of the volatile cation and a small amount of the volatile cation salt of the weak volatile acid, separating the two liquid phases, and heating the aqueous-organic solvent solution in order to decompose and volatilize the volatile cation salt of the weak volatile acid.

2. The process for removing by-product salts from organic sulphonic acid salts having at least six carbon atoms which comprises preparing an organic solvent solution of an organic sulphonic acid salt having at least six carbon atoms, treating the solution with sufficient water and a salt of a volatile cation and a weak volatile acid so that a concentrated aqueous solution of a salt of the weak volatile acid and the by-product salt separates from an immiscible aqueous-organic solvent phase containing the organic sulphonic acid salt of the volatile cation and a small amount of the volatile cation salt of the weak volatile acid, separating the two liquid phases, and heating the aqueous-organic solvent solution in order to decompose and volatilize the volatile cation salt of the weak volatile acid.

3. The process for removing by-product salts from organic sulphonic acid salts which comprises preparing an organic solvent solution of an organic sulphonic acid salt, treating the solution with sufficient water and an ammonium salt of a weak volatile acid so that a concentrated aqueous solution of a salt of the weak volatile acid and the by-product salt separates from an immiscible aqueous-organic solvent phase containing the organic sulphonic acid ammonium salt and a small amount of the ammonium salt of the weak volatile acid, separating the two liquid phases, and heating the aqueous-organic solvent solution in order to decompose and volatilize the ammonium salt of the weak volatile acid.

4. The process for removing by-product salts from organic sulphonic acid salts which comprises preparing an organic solvent solution of an organic sulphonic acid salt, treating the solution with sufficient water and ammonium carbonate so that a concentrated aqueous solution of a carbonate salt and the by-product salt separates from an immiscible aqueous-organic solvent phase containing the organic sulphonic acid ammonium salt and a small amount of the ammonium carbonate, separating the two liquid phases, and heating the aqueous-organic solvent solution in order to decompose and volatilize the ammonium carbonate.

5. The process of preparing organic sulphonic acid salts free of by-product salts which comprises preparing an organic solvent solution of an organic sulphonic acid salt, treating the solution with sufficient water and a salt of a volatile cation and a weak volatile acid so that a concentrated aqueous solution of a salt of the weak volatile acid and the by-product salt separates from an immiscible aqueous-organic solvent phase containing the organic sulphonic acid salt of the volatile cation and a small amount of the volatile cation salt of the weak volatile acid, separating the two liquid phases, heating the aqueous-organic solvent solution in order to decompose and volatilize the volatile cation salt of the weak volatile acid, admixing an equimolecular proportion of a basic compound of another less volatile cation but free of anions of non-volatile acids and strong acids, and heating the mixture to vaporize the more volatile cation and any volatile weak acids.

6. The process for removing by-product salts from aliphatic sulphate salts which comprises preparing an organic solvent solution of an aliphatic sulphate salt, treating the solution with sufficient water and a salt of a volatile cation and a weak volatile acid so that a concentrated aqueous solution of a salt of the weak volatile acid and the by-product salt separates from an immiscible aqueous-organic solvent phase containing the aliphatic sulphate salt of the volatile cation and a small amount of the volatile cation salt of the weak volatile acid, separating the two liquid phases, and heating the aqueous-organic solvent solution in order to decompose and volatilize the volatile cation salt of the weak volatile acid.

7. The process for removing by-product salts from halogenated gas oil sulphonate salts which comprises preparing an organic solvent solution of a halogenated gas oil sulphonate salt, treating the solution with sufficient water and a salt of a volatile cation and a weak volatile acid so that a concentrated aqueous solution of a salt of the weak volatile acid and the by-product salt separates from an immiscible aqueous-organic solvent phase containing the halogenated gas oil sulphonate salt of the volatile cation and a small amount of the volatile cation salt of the weak volatile acid, separating the two liquid phases, and heating the aqueous-organic solvent solution in order to decompose and volatilize the volatile cation salt of the weak volatile acid.

8. The process for removing by-product salts from aliphatic sulphate salts which comprises preparing an organic solvent solution of an aliphatic sulphate salt, treating the solution with sufficient water and an ammonium salt of a weak volatile acid so that a concentrated aqueous solution of a salt of the weak volatile acid and the by-product salt separates from an immiscible aqueous-organic solvent phase containing the aliphatic sulphate ammonium salt and a small amount of the ammonium salt of the weak volatile acid, separating the two liquid phases, and heating the aqueous-organic solvent solution in order to decompose and volatilize the ammonium salt of the weak volatile acid.

9. The process for removing by-product salts from halogenated gas oil sulphonate salts which comprises preparing an organic solvent solution of a halogenated gas oil sulphonate salt, treating the solution with sufficient water and an ammonium salt of a weak volatile acid so that a concentrated aqueous solution of a salt of the weak volatile acid and the by-product salt separates from an immiscible aqueous-organic solvent phase containing the halogenated gas oil sulphonate ammonium salt and a small amount of the ammonium salt of the weak volatile acid, separating the two liquid phases, and heating the aqueous-organic solvent solution in order to decompose and volatilize the ammonium salt of the weak volatile acid.

10. The process of preparing organic sulphonic acid salts free of by-product salts which comprises preparing an aqueous-alcohol solution of an organic sulphonic acid salt, treating the solution with sufficient water and ammonium carbonate so that a concentrated aqueous solution of ammonium carbonate separates from an immiscible aqueous alcohol phase containing the organic sulphonic ammonium salt and a small amount of the ammonium carbonate, separating the two liquid phases, heating the aqueous-alcohol solution in order to decompose and volatilize the ammonium carbonate, admixing an organic amine compound free of anions of non-volatile acids and strong acids, and heating the mixture to vaporize the ammonia freed from the organic sulphonic acid salt, as well as any excess organic amine and weak volatile acids.

11. The process for removing by-product salts from salts of organic acids which comprises preparing an organic solvent solution of a salt of an organic acid of the group consisting of organic sulphate salts and organic sulphonate salts, treating the solution with sufficient water and a salt of a volatile cation and a weak volatile acid so that a concentrated aqueous solution of a salt of the weak volatile acid and the by-product salt separates from an immiscible aqueous-organic solvent phase containing the organic acid salt of the volatile cation and a small amount of the volatile cation salt of the weak volatile acid, separating the two liquid phases, and heating the aqueous-organic solvent solution in order to decompose and volatilize the volatile cation salt of the weak volatile acid.

12. The process for removing by-product salts from salts of organic acids having at least six carbon atoms which comprises preparing an organic solvent solution of a salt of an organic acid of the group consisting of organic sulphate salts and organic sulphonate salts having at least six carbon atoms, treating the solution with sufficient water and a salt of a volatile cation and a weak volatile acid so that a concentrated aqueous solution of a salt of the weak volatile acid and the by-product salt separates from an immiscible aqueous-organic solvent phase containing the organic acid salt of the volatile cation and a small amount of the volatile cation salt of the weak volatile acid, separating the two liquid phases, and heating the aqueous-organic solvent solution in order to decompose and volatilize the volatile cation salt of the weak volatile acid.

13. The process for removing by-product salts from salts of organic acids which comprises preparing an organic solvent solution containing a salt of an organic acid of the group consisting of organic sulphate salts and organic sulphonate salts, treating the solution with sufficient water and an ammonium salt of a weak volatile acid so that a concentrated aqueous solution of a salt of the weak volatile acid and the by-product salt separates from an immiscible aqueous-organic solvent phase containing the organic acid ammonium salt and a small amount of the ammonium salt of the weak volatile acid, separating the two liquid phases, and heating the aqueous-organic solvent solution in order to decompose and volatilize the ammonium salt of the weak volatile acid.

14. The process for removing by-product salts from salts of organic acids which comprises preparing an organic solvent solution of a salt of an organic acid of the group consisting of organic sulphate salts and organic sulphonate salts, treating the solution with sufficient water and ammonium carbonate so that a concentrated aqueous solution of a carbonate salt and the by-product salt separates from an immiscible aqueous-organic solvent phase containing the organic acid ammonium salt and a small amount of the ammonium carbonate, separating the two liquid phases, and heating the aqueous-organic solvent solution in order to decompose and volatilize the ammonium carbonate.

15. The process of preparing organic acid salts free of by-product salts which comprises preparing an organic solvent solution of a salt of an organic acid of the group consisting of organic sulphate salts and organic sulphonate salts, treating the solution with sufficient water and a salt of a volatile cation and a weak volatile acid so that a concentrated aqueous solution of a salt of the weak volatile acid and the by-product salt separates from an immiscible aqueous-organic solvent phase containing the organic acid salt of the volatile cation and a small amount of the volatile cation salt of the weak volatile acid, separating the two liquid phases, heating the aqueous-organic solvent solution in order to decompose and volatilize the volatile cation salt of the weak volatile acid, admixing an equimolecular proportion of a basic compound of another less volatile cation but free of anions of a non-volatile acid, and heating the mixture to vaporize the more volatile cation and any volatile weak acids.

16. The process of preparing salts of organic acid free of by-product salts which comprises preparing an organic solvent solution of a salt of an organic acid of the group consisting of organic sulphate salts and organic sulphonate salts, treating the solution with sufficient water and a salt of a volatile cation and a weak volatile acid so that a concentrated aqueous solution of a salt of the weak volatile acid and the by-product salt separates from an immiscible aqueous-organic solvent phase containing the organic acid salt of the volatile cation and a small amount of the volatile cation salt of the weak volatile acid, separating the two liquid phases, heating the aqueous-organic solvent solution in order to decompose and volatilize the volatile cation salt of the weak volatile acid, admixing an excess of a basic compound of another less volatile cation which vaporizes at a temperature below that at which its salt of the organic acid decomposes, said addition compound being free of anions of a non-volatile acid, and heating the mixture to vaporize the more volatile cation, the excess of the less volatile cation and any volatile weak acids.

DWIGHT JAMES POTTER.